(12) United States Patent
Huang et al.

(10) Patent No.: US 11,244,468 B2
(45) Date of Patent: Feb. 8, 2022

(54) IMAGE OUTPUT ADJUSTMENT IN A ROBOTIC VEHICLE

(71) Applicant: QUALCOMM Incorporated, San Diego, CA (US)

(72) Inventors: Yin Huang, Beijing (CN); Xiaoyi Zhu, Beijing (CN); Leslie Chiming Chan, Hong Kong (CN); Ruowei Wang, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/621,482

(22) PCT Filed: Jul. 28, 2017

(86) PCT No.: PCT/CN2017/094861
§ 371 (c)(1),
(2) Date: Dec. 11, 2019

(87) PCT Pub. No.: WO2019/019132
PCT Pub. Date: Jan. 31, 2019

(65) Prior Publication Data
US 2020/0118288 A1    Apr. 16, 2020

(51) Int. Cl.
*G06T 7/70* (2017.01)
*G06T 7/30* (2017.01)
*G01C 21/20* (2006.01)

(52) U.S. Cl.
CPC ............... *G06T 7/70* (2017.01); *G01C 21/20* (2013.01); *G06T 7/30* (2017.01); *G06T 2207/30244* (2013.01); *G06T 2207/30252* (2013.01)

(58) Field of Classification Search
CPC .................... G01C 21/00; G01C 21/20; G06T 2207/10032; G06T 2207/30244; G06T 2207/30252; G06T 7/30; G06T 7/70
See application file for complete search history.

(56) References Cited

U.S. PATENT DOCUMENTS 8,855,929 B2    10/2014   Zhang et al.
9,188,973 B2 *  11/2015   Tenney .................. B25J 9/1697
(Continued)

FOREIGN PATENT DOCUMENTS

CN    102834696 A    12/2012
CN    103267523 A    8/2013
(Continued)

OTHER PUBLICATIONS

Li, Hongguang, et al. "Image registration and fusion of visible and infrared integrated camera for medium-altitude unmanned aerial vehicle remote sensing." Remote Sensing 9.5 (2017): 441. (Year: 2017).*

(Continued)

*Primary Examiner* — Kenny A Cese
(74) *Attorney, Agent, or Firm* — Qualcomm Incorporated

(57) ABSTRACT

Embodiments include devices and methods for processing an image captured by an image sensor of a robotic vehicle. A processor of the robotic vehicle may calculate an image output orientation matrix for an image that is output by the image sensor. The processor may calculate image sensor orientation matrix for the image sensor. The processor may calculate a body orientation matrix of the robotic vehicle. The processor may transform the image captured by the image sensor based on the image output orientation matrix, the image sensor orientation matrix, and the body orientation matrix.

26 Claims, 11 Drawing Sheets

(56) References Cited

U.S. PATENT DOCUMENTS

| | | | |
|---|---|---|---|
| 2004/0102911 A1* | 5/2004 | Roh | G06K 9/6204 |
| | | | 702/85 |
| 2011/0010026 A1 | 1/2011 | Jensen et al. | |
| 2013/0258129 A1 | 10/2013 | Burns | |
| 2014/0118341 A1* | 5/2014 | Shimizu | G06T 3/4038 |
| | | | 345/419 |
| 2016/0076892 A1 | 3/2016 | Zhou et al. | |

FOREIGN PATENT DOCUMENTS

| | | |
|---|---|---|
| CN | 106500669 A | 3/2017 |
| CN | 106529538 A | 3/2017 |
| WO | 2010/015866 A2 | 2/2010 |
| WO | 2011088469 A2 | 7/2011 |

OTHER PUBLICATIONS

Li et al., Image Registration and Fusion of Visible and Infrared Integrated Camera for Medium-Altitude Unmanned Aerial Vehicle Remote Sensing, 2017 (Year: 2017).*

Shauri et al., "Assembly manipulation of small objects by dual-arm manipulator", 2011, Assembly Automation 31 (3):263-274. (Year: 2011).*

International Search Report and Written Opinion—PCT/CN2017/094861—ISA—dated Apr. 18, 2018, 9 pages.

Supplementary European Search Report—EP17918871—Search Authority—The Hague—dated Mar. 4, 2021.

\* cited by examiner

IMAGE OUTPUT ADJUSTMENT IN A ROBOTIC VEHICLE

BACKGROUND

Robotic vehicles may be deployed in a wide range of applications. Robotic vehicles may be configured with a wide range of body frames. Further, robotic vehicles may be configured with, or may determine, a vehicle coordinate system that may have a variety of applications.

Robotic vehicles may be equipped with one or more image sensors, such as cameras capable of capturing an image, a sequence of images, or video. Processing images captured by robotic vehicle image sensors is complicated by a wide range of variations in equipment configurations and environmental conditions. Image sensors are available in numerous configurations and may vary, among other things, in the ways in which the sensors capture images and output captured images. For example, an image sensor may be configured to capture images at a particular orientation (e.g., landscape or portrait), and at a particular resolution. Further, the image sensor (or an image processing system) may be configured to output captured images at a different orientation and/or resolution. Also, the orientation of the robotic vehicle body may vary as the robotic vehicle moves and/or is affected by its environment.

SUMMARY

Various embodiments include methods that may be implemented on a processor of a robotic vehicle for processing an image captured by an image sensor of the robotic vehicle. Various embodiments may include calculating an image output orientation matrix for an image that is output by the image sensor, calculating an image sensor orientation matrix for the image sensor, calculating a body orientation matrix of the robotic vehicle, and transforming an image captured by the image sensor based on the image output orientation matrix, the image sensor orientation matrix, and the body orientation matrix.

In some embodiments, transforming the image captured by the image sensor based on the image output orientation matrix, the image sensor orientation matrix, and the body orientation matrix may include calculating a rotation matrix based on the image output orientation matrix, the image sensor orientation matrix, and the body orientation matrix, and transforming the image captured by the image sensor based on the rotation matrix.

In some embodiments, the image output orientation matrix may be based on an orientation of the image output by the image sensor. In some embodiments, the body orientation matrix may be based on a first coordinate system, and the image sensor orientation matrix may be based on a second coordinate system that is different from the first coordinate system. In some embodiments, the body orientation matrix may be based on a first coordinate system, the image sensor orientation matrix may be based on a second coordinate system that is different from the first coordinate system, and the image output orientation matrix may be based on a third coordinate system that is different from one or both of the first coordinate system and the second coordinate system.

Some embodiments may further include determining a relative image sensor pose, in which the image sensor orientation matrix is based on the relative image sensor pose. Some embodiments may further include determining a relative body orientation of the robotic vehicle, in which the body orientation matrix is based on the relative body orientation of the robotic vehicle. Some embodiments may further include outputting the transformed image.

Further embodiments may include a robotic vehicle configured with processor-executable instructions to perform operations of the methods described above. Further embodiments may include a processing device for use in a robotic vehicle configured to perform operations of the methods described, above. Further embodiments may include a robotic vehicle including means for performing functions of the methods described above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
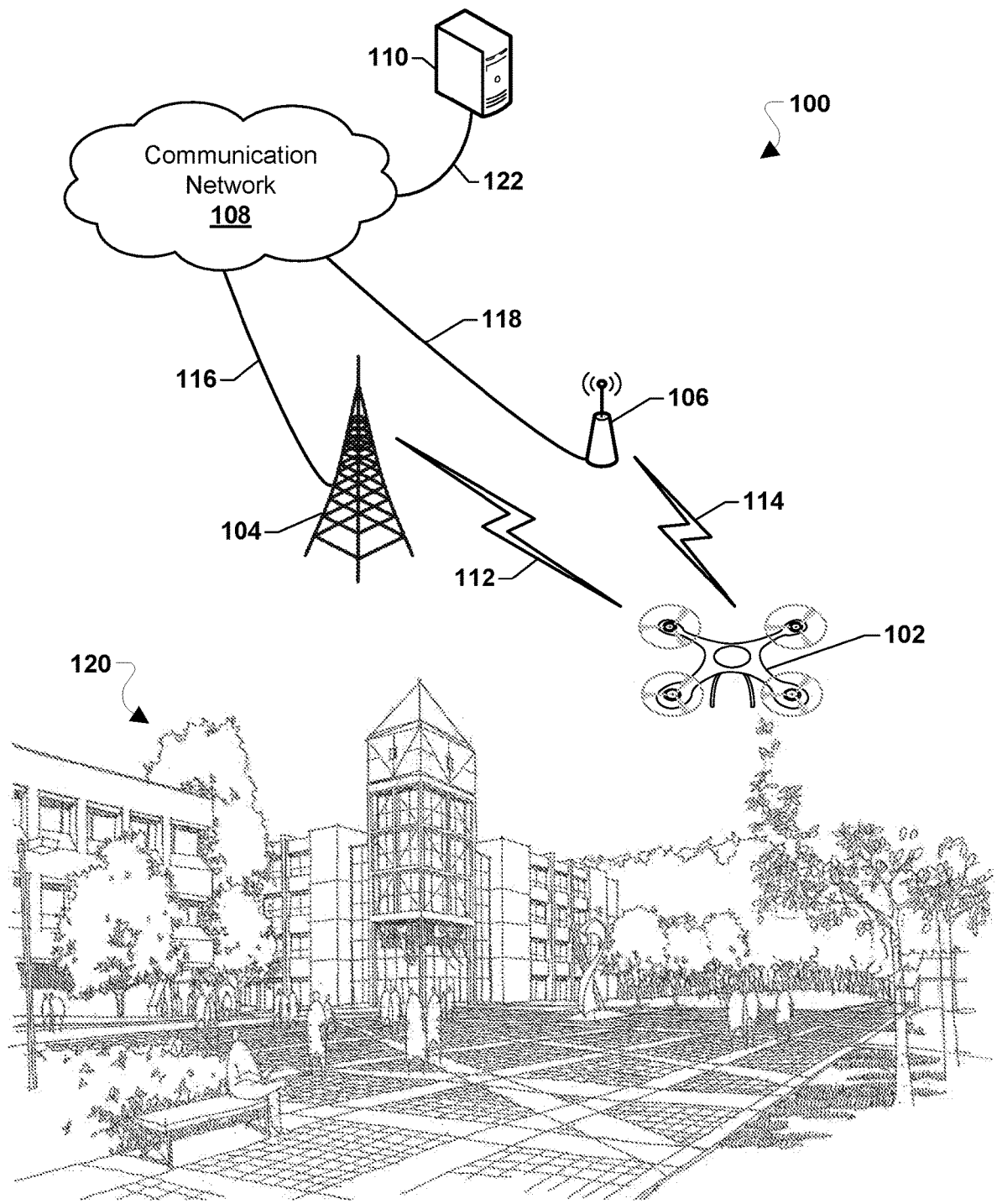
FIG. 1 is a system block diagram of a robotic vehicle operating within communication system according to various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include methods that may be implemented by a processor of a robotic vehicle for processing images captured by an image sensor of the robotic vehicle that may be employed with any combination of image sensors, robotic vehicle body frames, and image output orientations. Various embodiments improve efficiency and accuracy of image processing of images captured by a robotic vehicle, and improve the efficiency and accuracy of image processing of such images for a wide range of robotic vehicle body frames that may use differing body frame coordinate systems, as well as different image sensor mountings to the robotic vehicle.

As used herein, the term "robotic vehicle" refers to one of various types of vehicles including an onboard processing device configured to provide some autonomous or semi-autonomous capabilities. Examples of robotic vehicles include but are not limited to: aerial vehicles, such as an unmanned aerial vehicle (UAV); ground vehicles (e.g., an autonomous or semi-autonomous car, a vacuum robot, etc.); water-based vehicles (i.e., vehicles configured for operation on the surface of the water or under water); space-based vehicles (e.g., a spacecraft or space probe); and/or some combination thereof. In some embodiments, the robotic vehicle may be manned. In other embodiments, the robotic vehicle may be unmanned. In embodiments in which the robotic vehicle is autonomous, the robotic vehicle may include an onboard computing device configured to maneuver and/or navigate the robotic vehicle without remote operating instructions (i.e., autonomously), such as from a human operator (e.g., via a remote computing device). In embodiments in which the robotic vehicle is semi-autonomous, the robotic vehicle may include an onboard computing device configured to receive some information or instructions, such as from a human operator (e.g., via a remote computing device), and autonomously maneuver and/or navigate the robotic vehicle consistent with the received information or instructions. In some implementations, the robotic vehicle may be an aerial vehicle (unmanned or manned), which may be a rotorcraft or winged aircraft. For example, a rotorcraft (also referred to as a multirotor or multicopter) may include a plurality of propulsion units (e.g., rotors/propellers) that provide propulsion and/or lifting forces for the robotic vehicle. Specific non-limiting examples of rotorcraft include tricopters (three rotors), quadcopters (four rotors), hexacopters (six rotors), and octocopters (eight rotors). However, a rotorcraft may include any number of rotors. A robotic vehicle may include a variety of components and/or payloads that may perform a variety of functions.

Robotic vehicles are increasingly equipped with image sensor devices for capturing images and video. Complicating the integration of image sensors with robotic vehicles is the fact that robotic vehicle body frames and image sensors may be configured with different coordinate systems. For example, robotic vehicles may include a wide variety of body frames, and manufacturers of such body frames may utilize different coordinate systems in a flight controller or another processor of the robotic vehicle. One example of a body frame coordinate system is North-East-Down (NED), in which positive values along the x-axis indicates north, positive values along the y-axis indicates east, and positive values along the x-axis indicates down (i.e., toward gravity). Another example of a body frame coordinate system is North-West-Up (NWU), in which positive values along the x-axis indicates north, positive values along the y-axis indicates west, and positive values along the x-axis indicates up (i.e., away from gravity).

An image sensor may be mounted on the robotic vehicle using either the landscape orientation or portrait orientation. Further, the precise image sensor orientation and pitch may vary from vehicle to vehicle. In addition, the image sensor may output image images in a variety of orientations (e.g., landscape output or portrait output). Differences in the image sensor orientation and the orientation of the output image may cause distortions or another degradation of the output image, such as improperly oriented output images.

Various embodiments provide methods implemented by a processor of a robotic vehicle for processing an image captured by an image sensor of the robotic vehicle that may be employed in any combination of image sensors, robotic vehicle body frames, and image output orientations. Various embodiments further improve efficiency and accuracy of image processing of images captured by a robotic vehicle, and further improve the efficiency and accuracy of image processing of such images for a wide range of robotic vehicle body frames that may use different body frame coordinate systems, as well as different mountings of the image sensor to the robotic vehicle.

In various embodiments, a processor of the robotic vehicle may process an image captured by an image sensor of a robotic vehicle. The processor of the robotic vehicle may calculate an image output orientation matrix for an image that is output by the image sensor. The processor may calculate an image sensor orientation matrix the image sensor. The processor may calculate a body orientation matrix of the robotic vehicle. The processor may transform images captured by the image sensor based on a product of the image output orientation matrix, the image sensor orientation matrix, and the body orientation matrix.

Various embodiments may be implemented within a robotic vehicle operating within a variety of communication systems 100, an example of which is illustrated in FIG. 1. With reference to FIG. 1, the communication system 100 may include a robotic vehicle 102, a base station 104, an access point 106, a communication network 108, and a network element 110.

The base station 104 and the access point 106 may provide wireless communications to access the communication network 108 over a wired and/or wireless communications backhaul 116 and 118, respectively. The base station 104 may include base stations configured to provide wireless communications over a wide area (e.g., macro cells), as well as small cells, which may include a micro cell, a femto cell, a pico cell, and other similar network access points. The access point 106 may include access points configured to provide wireless communications over a relatively smaller area. Other examples of base stations and access points are also possible.

The robotic vehicle 102 may communicate with the base station 104 over a wireless communication link 112, and with the access point 106 over a wireless communication link 114. The wireless communication links 112 and 114 may include a plurality of carrier signals, frequencies, or frequency bands, each of which may include a plurality of logical channels. The wireless communication links 112 and 114 may utilize one or more radio access technologies (RATs). Examples of RATs that may be used in a wireless communication link include 3GPP Long Term Evolution (LTE), 3G, 4G, 5G, Global System for Mobility (GSM), Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-Direct, LAA, MuLTEfire, and relatively short range RATs such as ZigBee, Bluetooth, and Bluetooth Low Energy (LE).

The network element 110 may include a network server or another similar network element. The network element 110 may communicate with the communication network 108 over a communication link 122. The robotic vehicle 102 and the network element 110 may communicate via the communication network 108. The network element 110 may provide the robotic vehicle 102 with a variety of information, such as navigation information, weather information, information about local air, ground, and/or sea traffic, movement control instructions, and other information, instructions, or commands relevant to operations of the robotic vehicle 102.

In various embodiments, the robotic vehicle 102 may move through an environment 120. As the robotic vehicle 102 moves through the environment 120, the processor of the robotic vehicle 102 may capture images or video of an aspect of the environment 120.

Figure 2:
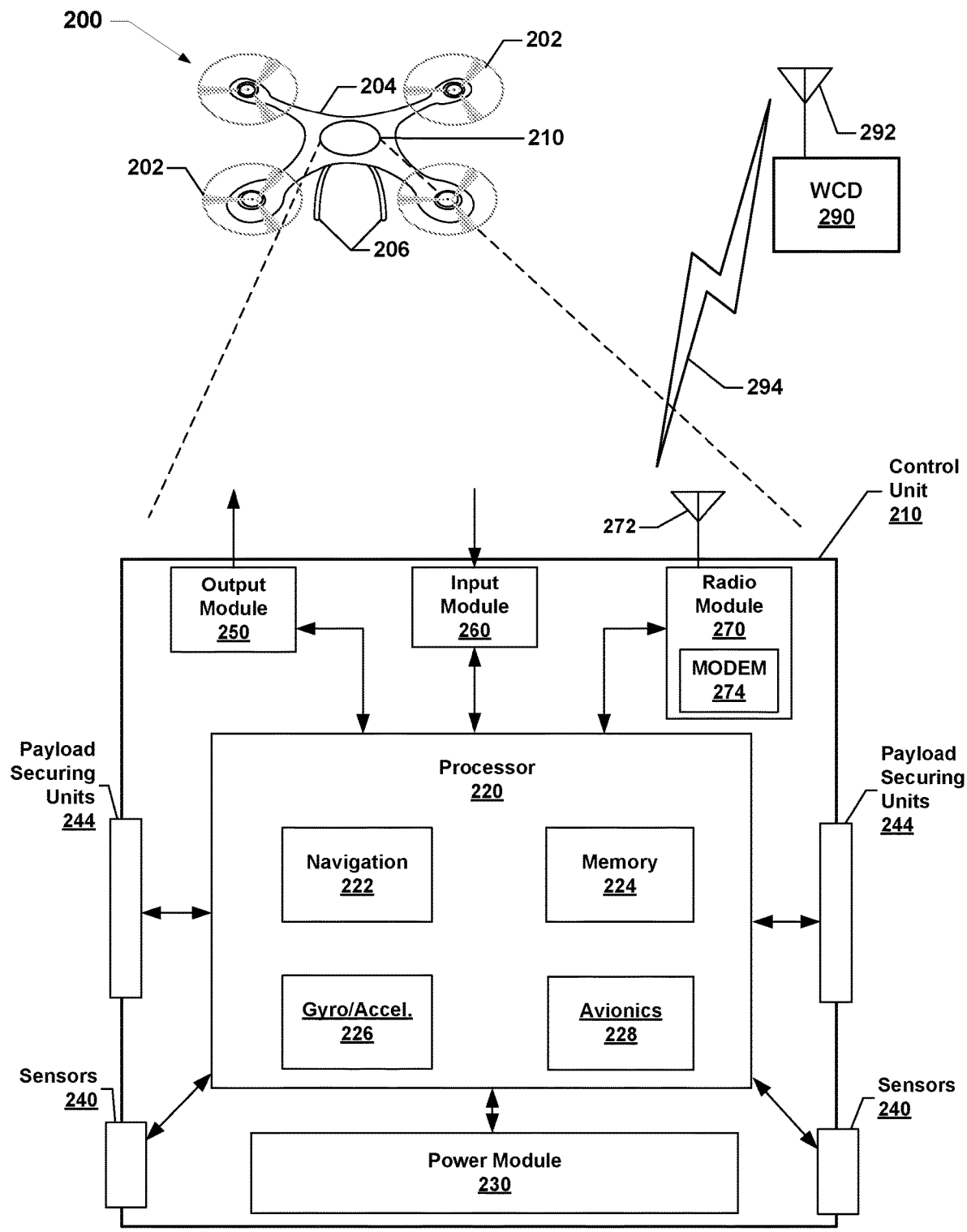
FIG. 2 is a component block diagram illustrating components of a robotic vehicle according to various embodiments.

Robotic vehicles may include winged or rotorcraft varieties. FIG. 2 illustrates an example robotic vehicle 200 of a rotary propulsion design that utilizes one or more rotors 202 driven by corresponding motors to provide lift-off (or takeoff) as well as other aerial movements (e.g., forward progression, ascension, descending, lateral movements, tilting, rotating, etc.). The robotic vehicle 200 is illustrated as an example of a robotic vehicle that may utilize various embodiments, but is not intended to imply or require that various embodiments are limited to rotorcraft robotic vehicles. Various embodiments may be used with winged robotic vehicles as well. Further, various embodiments may equally be used with land-based autonomous vehicles, water-borne autonomous vehicles, and space-based autonomous vehicles.

With reference to FIGS. 1 and 2, the robotic vehicle 200 may be similar to the robotic vehicle 102. The robotic vehicle 200 may include a number of rotors 202, a frame 204, and landing columns 206 or skids. The frame 204 may provide structural support for the motors associated with the rotors 202. The landing columns 206 may support the maximum load weight for the combination of the components of the robotic vehicle 200 and, in some cases, a payload. For ease of description and illustration, some detailed aspects of the robotic vehicle 200 are omitted such as wiring, frame structure interconnects, or other features that would be known to one of skill in the art. For example, while the robotic vehicle 200 is shown and described as having a frame 204 having a number of support members or frame structures, the robotic vehicle 200 may be constructed using a molded frame in which support is obtained through the molded structure. While the illustrated robotic vehicle 200 has four rotors 202, this is merely exemplary and various embodiments may include more or fewer than four rotors 202.

The robotic vehicle 200 may further include a control unit 210 that may house various circuits and devices used to power and control the operation of the robotic vehicle 200. The control unit 210 may include a processor 220, a power module 230, sensors 240, payload-securing units 244, an output module 250, an input module 260, and a radio module 270.

The processor 220 may be configured with processor-executable instructions to control travel and other operations of the robotic vehicle 200, including operations of various embodiments. The processor 220 may include or be coupled to a navigation unit 222, a memory 224, a gyro/accelerometer unit 226, and an avionics module 228. The processor 220 and/or the navigation unit 222 may be configured to communicate with a server through a wireless connection (e.g., a cellular data network) to receive data useful in navigation, provide real-time position reports, and assess data.

The avionics module 228 may be coupled to the processor 220 and/or the navigation unit 222, and may be configured to provide travel control-related information such as altitude, attitude, airspeed, heading, and similar information that the navigation unit 222 may use for navigation purposes, such as dead reckoning between Global Navigation Satellite System (GLASS) position updates. The gyro/accelerometer unit 226 may include an accelerometer, a gyroscope, an inertial sensor, or other similar sensors. The avionics module 228 may include or receive data from the gyro/accelerometer unit 226 that provides data regarding the orientation and accelerations of the robotic vehicle 200 that may be used in navigation and positioning calculations, as well as providing data used in various embodiments for processing images.

The processor 220 may further receive additional information from the sensors 240, such as an image sensor or optical sensor (e.g., capable of sensing visible light, infrared, ultraviolet, and/or other wavelengths of light). The sensors 240 may also include a radio frequency (RF) sensor, a barometer, a sonar emitter/detector, a radar emitter/detector, a microphone or another acoustic sensor, or another sensor that may provide information usable by the processor 220 for movement operations as well as navigation and positioning calculations. The sensors 240 may include contact or pressure sensors that may provide a signal that indicates when the robotic vehicle 200 has made contact with a surface. The payload-securing units 244 may include an actuator motor that drives a gripping and release mechanism and related controls that are responsive to the control unit 210 to grip and release a payload in response to commands from the control unit 210.

The power module 230 may include one or more batteries that may provide power to various components, including the processor 220, the sensors 240, the payload-securing units 244, the output module 250, the input module 260, and the radio module 270. In addition, the power module 230 may include energy storage components, such as rechargeable batteries. The processor 220 may be configured with processor-executable instructions to control the charging of the power module 230 (i.e., the storage of harvested energy), such as by executing a charging control algorithm using a charge control circuit. Alternatively or additionally, the power module 230 may be configured to manage its own charging. The processor 220 may be coupled to the output module 250, which may output control signals for managing the motors that drive the rotors 202 and other components.

The robotic vehicle 200 may be controlled through control of the individual motors of the rotors 202 as the robotic vehicle 200 progresses toward a destination. The processor 220 may receive data from the navigation unit 222 and use such data in order to determine the present position and orientation of the robotic vehicle 200, as well as the appropriate course towards the destination or intermediate sites. In various embodiments, the navigation unit 222 may include a GNSS receiver system (e.g., one or more global positioning system (GPS) receivers) enabling the robotic vehicle 200 to navigate using GNSS signals. Alternatively or in addition, the navigation unit 222 may be equipped with radio navigation receivers for receiving navigation beacons or other signals from radio nodes, such as navigation beacons (e.g., very high frequency (VHF) omni-directional range (VOR)

beacons), Wi-Fi access points, cellular network sites, radio station, remote computing devices, other robotic vehicles, etc.

The radio module 270 may be configured to receive navigation signals, such as signals from aviation navigation facilities, etc., and provide such signals to the processor 220 and/or the navigation unit 222 to assist in robotic vehicle navigation. In various embodiments, the navigation unit 222 may use signals received from recognizable RF emitters (e.g., AM/FM radio stations, Wi-Fi access points, and cellular network base stations) on the ground.

The radio module 270 may include a modem 274 and a transmit/receive antenna 272. The radio module 270 may be configured to conduct wireless communications with a variety of wireless communication devices (e.g., a wireless communication device (WCD) 290), examples of which include a wireless telephony base station or cell tower (e.g., the base station 104), a network access point (e.g., the access point 106), a beacon, a smartphone, a tablet, or another computing device with which the robotic vehicle 200 may communicate (such as the network element 110). The processor 220 may establish a bi-directional wireless communication link 294 via the modem 274 and the antenna 272 of the radio module 270 and the wireless communication device 290 via a transmit/receive antenna 292. In some embodiments, the radio module 270 may be configured to support multiple connections with different wireless communication devices using different radio access technologies.

In various embodiments, the wireless communication device 290 may be connected to a server through intermediate access points. In an example, the wireless communication device 290 may be a server of a robotic vehicle operator, a third party service (e.g., package delivery, billing, etc.), or a site communication access point. The robotic vehicle 200 may communicate with a server through one or more intermediate communication links, such as a wireless telephony network that is coupled to a wide area network (e.g., the Internet) or other communication devices. In some embodiments, the robotic vehicle 200 may include and employ other forms of radio communication, such as mesh connections with other robotic vehicles or connections to other information sources (e.g., balloons or other stations for collecting and/or distributing weather or other data harvesting information).

In various embodiments, the control unit 210 may be equipped with an input module 260, which may be used for a variety of applications. For example, the input module 260 may receive images or data from an onboard camera or sensor, or may receive electronic signals from other components (e.g., a payload).

Figure 3:
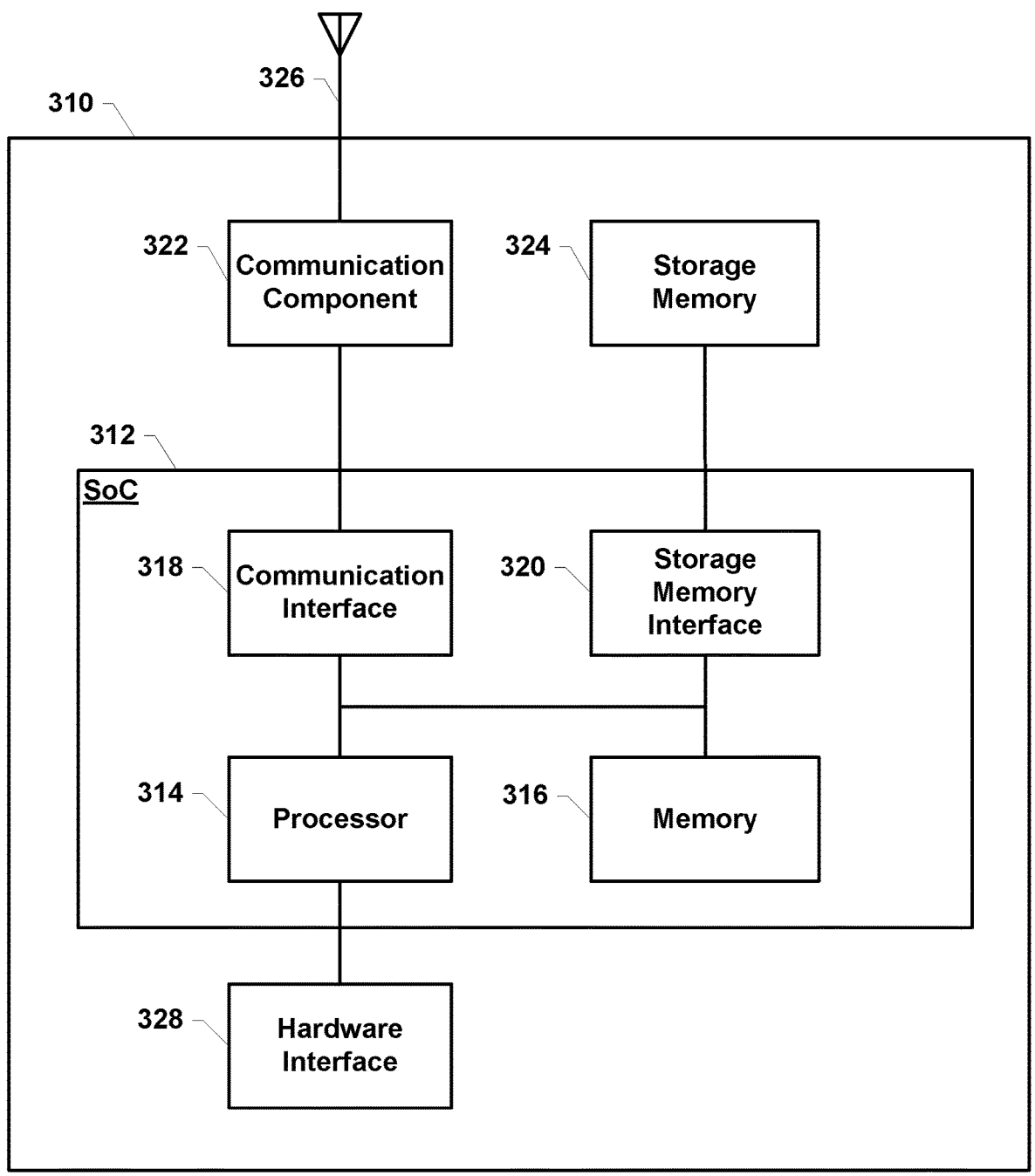
FIG. 3 is a component block diagram illustrating a processing device suitable for use in robotic vehicles implementing various embodiments.

While various components of the control unit 210 are illustrated in FIG. 2 as separate components, some or all of the components (e.g., the processor 220, the output module 250, the radio module 270, and other units) may be integrated together in a single processing device 310, an example of which is illustrated in FIG. 3.

With reference to FIGS. 1-3, the processing device 310 may be configured to be used in a robotic vehicle and may be configured as or including a system-on-chip (SoC) 312. The SoC 312 may include (but is not limited to) a processor 314, a memory 316, a communication interface 318, and a storage memory interface 320. The processing device 310 or the SoC 312 may further include a communication component 322, such as a wired or wireless modem, a storage memory 324, an antenna 326 for establishing a wireless communication link, and/or the like. The processing device 310 or the SoC 312 may further include a hardware interface 328 configured to enable the processor 314 to communicate with and control various components of a robotic vehicle. The processor 314 may include any of a variety of processing devices, for example any number of processor cores.

The term "system-on-chip" (SoC) is used herein to refer to a set of interconnected electronic circuits typically, but not exclusively, including one or more processors (e.g., 314), a memory (e.g., 316), and a communication interface (e.g., 318). The SoC 312 may include a variety of different types of processors 314 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The SoC 312 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The SoC 312 may include one or more processors 314. The processing device 310 may include more than one SoC 312, thereby increasing the number of processors 314 and processor cores. The processing device 310 may also include processors 314 that are not associated with an SoC 312 (i.e., external to the SoC 312). Individual processors 314 may be multicore processors. The processors 314 may each be configured for specific purposes that may be the same as or different from other processors 314 of the processing device 310 or SoC 312. One or more of the processors 314 and processor cores of the same or different configurations may be grouped together. A group of processors 314 or processor cores may be referred to as a multi-processor cluster.

The memory 316 of the SoC 312 may be a volatile or non-volatile memory configured for storing data and processor-executable instructions for access by the processor 314. The processing device 310 and/or SoC 312 may include one or more memories 316 configured for various purposes. One or more memories 316 may include volatile memories such as random access memory (RAM) or main memory, or cache memory.

Some or all of the components of the processing device 310 and the SoC 312 may be arranged differently and/or combined while still serving the functions of the various aspects. The processing device 310 and the SoC 312 may not be limited to one of each of the components, and multiple instances of each component may be included in various configurations of the processing device 310.

Figure 4:
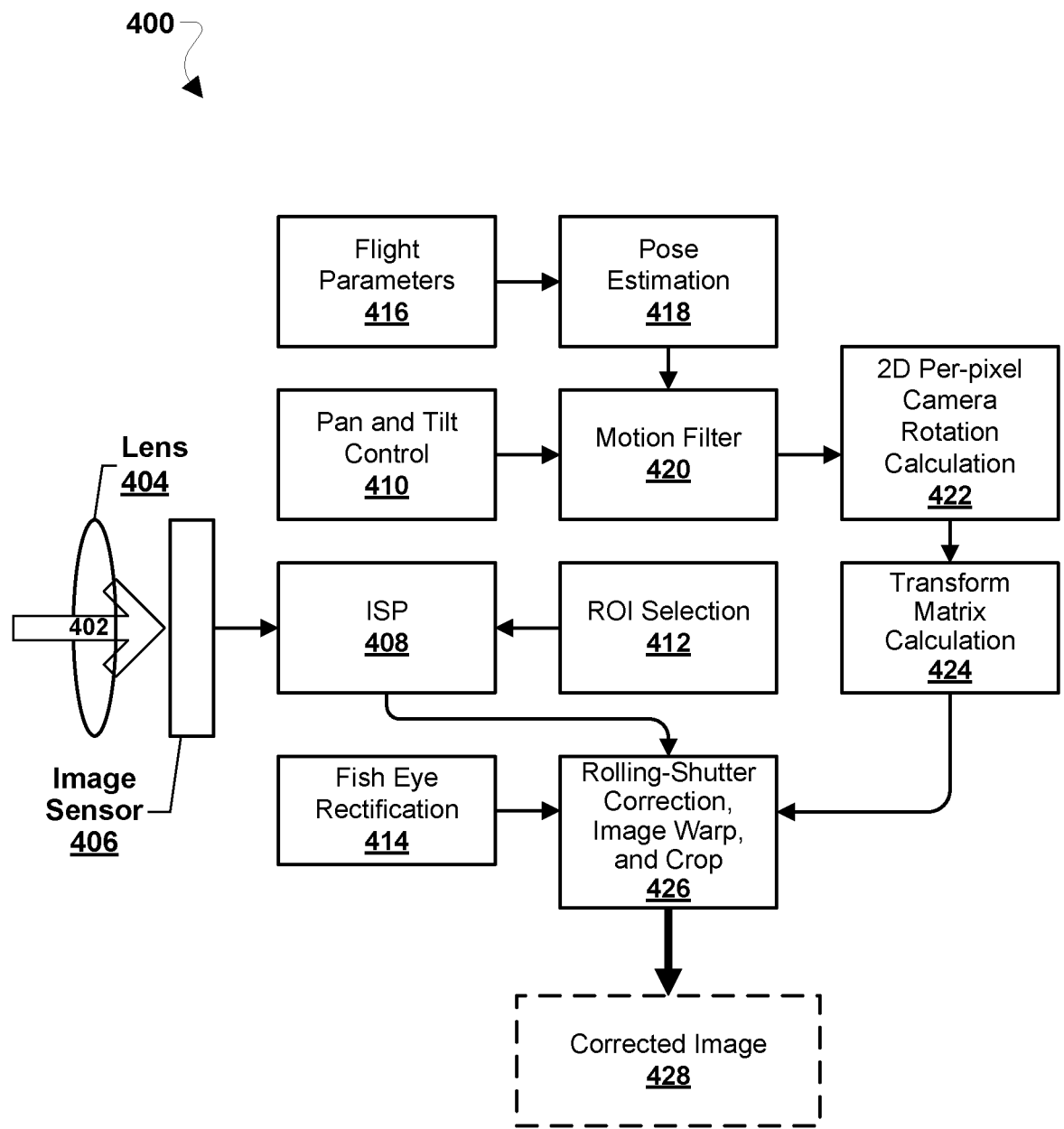
FIG. 4 is a component block diagram illustrating components of an image capture and processing system of a robotic vehicle according to various embodiments.

FIG. 4 illustrates an image capture and processing system 400 of a robotic vehicle (e.g., 102, 200 in FIGS. 1 and 2) according to various embodiments. With reference to FIGS. 1-4, the image capture and processing system 400 may be implemented in hardware components and/or software components of the robotic vehicle, the operation of which may be controlled by one or more processors (e.g., the processor 220 and/or the like) of the robotic vehicle. To enable digital image stabilization, spurious motion of the robotic vehicle may be estimated from information detected by a processor of the robotic vehicle. Some embodiments of various components that may enable such digital image stabilization are illustrated in the image capture and processing system 400.

An image sensor 406 may capture light of an image 402 that enters through a lens 404. The lens 404 may include a fish eye lens or another similar lens that may be configured to provide a wide image capture angle. The image sensor 406 may provide image data to an image signal processing (ISP) unit 408. A region of interest (ROI) selection unit 412 may provide data to the ISP 408 data for the selection of a region of interest within the image data.

The ISP 408 may provide image information and ROI selection information to a rolling-shutter correction, image warp, and crop unit 426. A fish eye rectification unit 414 may provide information and/or processing functions to the rolling-shutter correction, image warp, and crop unit 426.

A flight parameters unit 416 may determine inertial measurement data and robotic vehicle position and orientation data. For example, the flight parameters unit 416 may obtain or receive the inertial measurement data and robotic vehicle position and orientation data from one or more sensors of the robotic vehicle (e.g., the sensors 240). The flight parameters unit 416 may provide the inertial measurement data and robotic vehicle position and orientation data to a pose (position and orientation) estimation unit 418.

The pose estimation unit 418 may determine a position and orientation of the robotic vehicle based on the inertial measure data and the position and orientation data. In some embodiments, the pose estimation unit 418 may determine the position and orientation (e.g., pitch, roll, and yaw) of the robotic vehicle based on a coordinate system of the robotic vehicle (e.g., NED or NWU). The pose estimate unit 418 may provide the determined position and orientation of the robotic vehicle to a motion filter unit 420. Additionally, a pan and tilt control unit 410 may provide data about the pan and/or tilt, of the image sensor to the motion filter unit 420.

The motion filter unit 420 may determine physical and/or virtual pose changes of an image sensor of the robotic vehicle (e.g., the sensor 240) based on the position and orientation information from the pose estimation unit 418 and the pan and/or tilt information from the pan and tilt control unit 410. In some embodiments, the motion filter unit 420 may determine the physical or virtual pose changes of the image sensor over time. In some embodiments, the motion filter unit 420 may determine the physical or virtual pose changes based on one or more changes between a first image and second subsequent image. In some embodiments, the motion filter unit 420 may determine the physical or virtual pose changes of the image sensor on a frame-by-frame basis. The motion filter unit may provide the determined physical and/or virtual pose changes of an image sensor to a per-pixel camera rotation calculation unit 422.

The per-pixel camera rotation calculation unit 422 may determine a rotation to perform to the image information on a pixel-by-pixel basis. The per-pixel camera rotation calculation unit 422 may provide information about the determined rotation to a transform matrix calculation unit 424.

The transform matrix calculation unit 424 may determine a transformation matrix for use in processing an image. The transform matrix calculation unit 424 may provide the transformation matrix to the rolling-shutter correction and warp unit 426.

The rolling-shutter correction and warp unit 426 may crop the image information, correct for distortions in the image caused by the lens 404, and may apply the transformation matrix to the image information. The rolling-shutter correction and warp unit 426 may provide as output a corrected image 428 based on the cropping, distortion correction, and/or application of the transformation matrix. In some embodiments, the corrected image may include an image having a corrected horizontal orientation or horizontal rotation. In some embodiments, the corrected image may include a stabilized video output.

Figure 5A:
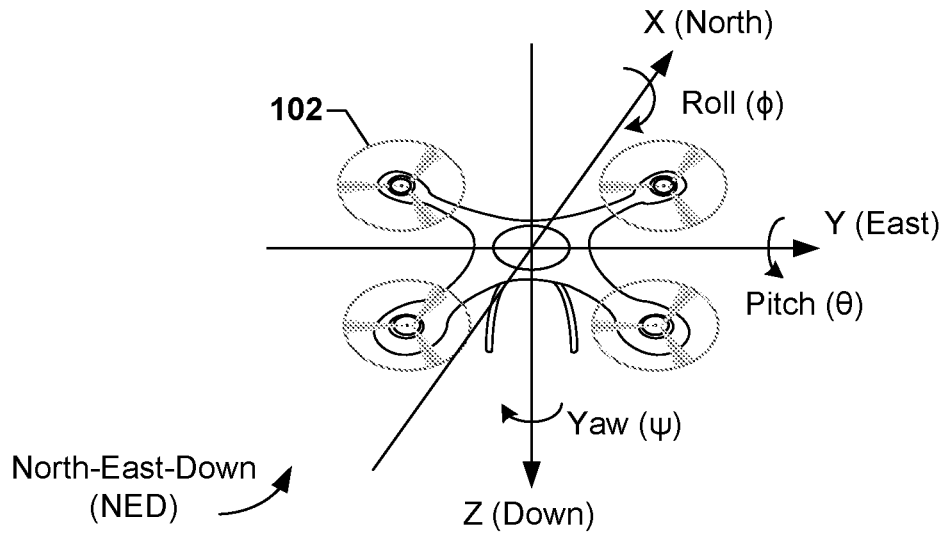
FIGS. 5A and 5B illustrate coordinate systems of robotic vehicles according to various embodiments.
Figure 5B:
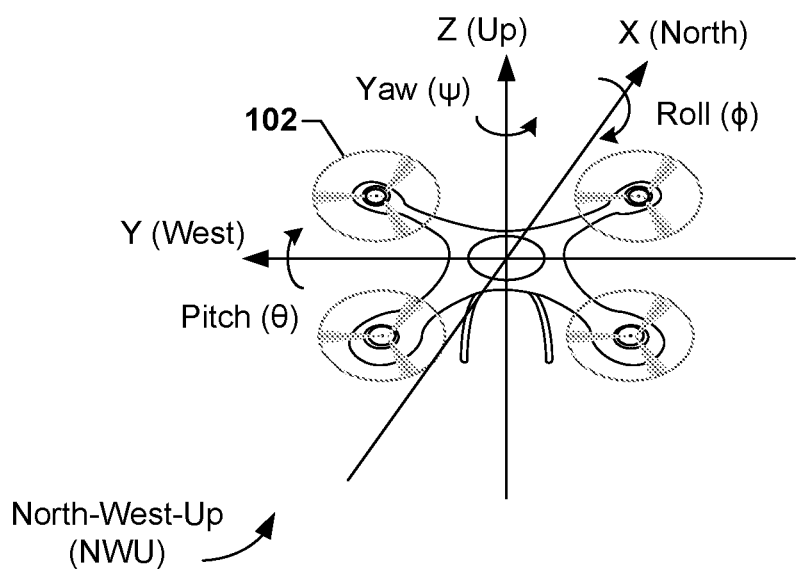

FIGS. 5A and 5B illustrate body frame coordinate systems of robotic vehicles according to various embodiments. With reference to FIGS. 1-5B, a processor of a robotic vehicle (e.g., the processor 220, 314, the SoC 312, and/or the like) and hardware components and/or software components of the robotic vehicle may capture and process an image or video based on a coordinate system of the robotic vehicle (in addition to information about the mounting or orientation of an image sensor on the robotic vehicle, and information about an orientation of the output of the image sensor). Robotic vehicles may include a wide variety of body frames, and manufacturers of such body frames may utilize different coordinate systems, for example, in a flight controller or another processor of the robotic vehicle.

FIG. 5A illustrates an example of a North-East-Down (NED) body frame coordinate system, in which positive values along the x-axis indicates north, positive values along the y-axis indicates east, and positive values along the x-axis indicates down (i.e., toward gravity).

FIG. 5B illustrates an example of a North-West-Up (NWU) body frame coordinate system in which positive values along the x-axis indicates north, positive values along the y-axis indicates west, and positive values along the x-axis indicates up (i.e., away from gravity).

In some embodiments, the processor of the robotic vehicle may dynamically determine an orientation of the body frame of the robotic vehicle. In some embodiments, the processor may receive or obtain information from one or more sensors of the robotic vehicle, and may determine the body frame orientation based on the sensor information. In some embodiments, the processor may receive or obtain information from one or more sensors of the robotic vehicle by performing a rotation of an angle (e.g., $\phi$) around the x-axis of the robotic vehicle. For example, the processor may determine rotation matrices for vehicle roll (Rroll), vehicle pitch (Rpitch), and vehicle yaw (Ryaw), according to the following equations:

$$R_{roll} = \begin{bmatrix} 1 & 0 & 0 \\ 0 & \cos\phi & -\sin\phi \\ 0 & \sin\phi & \cos\phi \end{bmatrix} \qquad \text{[Equation 1]}$$

$$R_{pitch} = \begin{bmatrix} \cos\theta & 0 & \sin\theta \\ 0 & 1 & 0 \\ -\sin\theta & 0 & \cos\theta \end{bmatrix} \qquad \text{[Equation 2]}$$

$$R_{yaw} = \begin{bmatrix} \cos\psi & -\sin\psi & 0 \\ \sin\psi & \cos\psi & 0 \\ 0 & 0 & 1 \end{bmatrix} \qquad \text{[Equation 3]}$$

The processor may determine an orientation matrix for the robotic vehicle based on the rotation matrices for vehicle roll, vehicle pitch, and vehicle yaw. For example, the processor may determine an orientation matrix Rsb according to the following equation:

$$R_{sb} = R_{yaw} R_{pitch} R_{roll} = \begin{bmatrix} r_{11} & r_{12} & r_{13} \\ r_{12} & r_{22} & r_{23} \\ r_{31} & r_{32} & r_{33} \end{bmatrix} = \qquad \text{[Equation 4]}$$

-continued $$\begin{bmatrix} \cos\theta\cos\psi & \sin\phi\sin\theta\cos\psi - \cos\phi\sin\psi & \cos\phi\sin\theta\cos\psi + \sin\phi\sin\psi \\ \cos\theta\sin\psi & \sin\phi\sin\theta\sin\psi + \cos\phi\cos\psi & \cos\phi\sin\theta\sin\psi - \sin\phi\cos\psi \\ -\sin\theta & \sin\phi\cos\theta & \cos\phi\cos\theta \end{bmatrix}$$

In some embodiments, the processor may apply the orientation matrix to convert from an inertial frame to a body frame of the robotic vehicle, as further described below.

Figure 6:
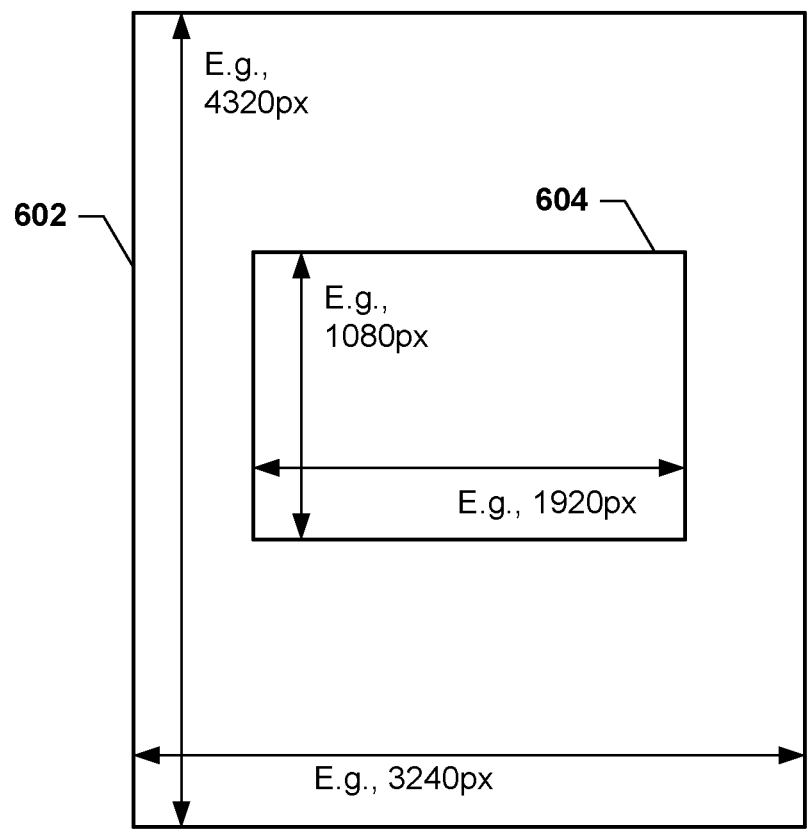
FIG. 6 illustrates an image sensor orientation and an output image orientation according to various embodiments.

FIG. 6 illustrates an example image sensor orientation and output image orientation according to some embodiments. With reference to FIGS. 1-7, an image sensor may include a high resolution image capture device, and may be configured in an orientation 602. For example, the orientation 602 may include an x-axis (for example, 3240 pixels) and a y-axis (for example, 4320 pixels). In some embodiments, the image sensor may capture an image in a particular aspect ratio, such as 4:3.

In some embodiments, an image processing system (e.g., the image capture and processing system 400) may process the captured image data. In some embodiments, the image processing system may reduce a size of the captured image. In some embodiments, the image processing system may process the captured the image into a different aspect ratio, such as 16:9. For example, a processed image output by the image processing system may include an x-axis and a y-axis that are reduced from the x-axis and y-axis of the captured image. For example, the processed image may include an x-axis of 1920 pixels and a y-axis of 1080 pixels. In some embodiments, the image sensor may be configured to capture an image in a fixed orientation, such as portrait orientation, or in a fixed aspect ratio (e.g., 4:3, 4320×3240, etc.). While the image processing system may be configured to process the captured image data into a different resolution (e.g., 1920×1080) or a different aspect ratio (e.g., 16:9), other factors may affect the quality and/or fidelity of the output image. For example, the body frame orientation of the robotic vehicle, as well as the relative orientation of the image sensor to the robotic vehicle body frame, and may degrade the quality, fidelity, orientation, and other aspects of the output image.

Figure 7:
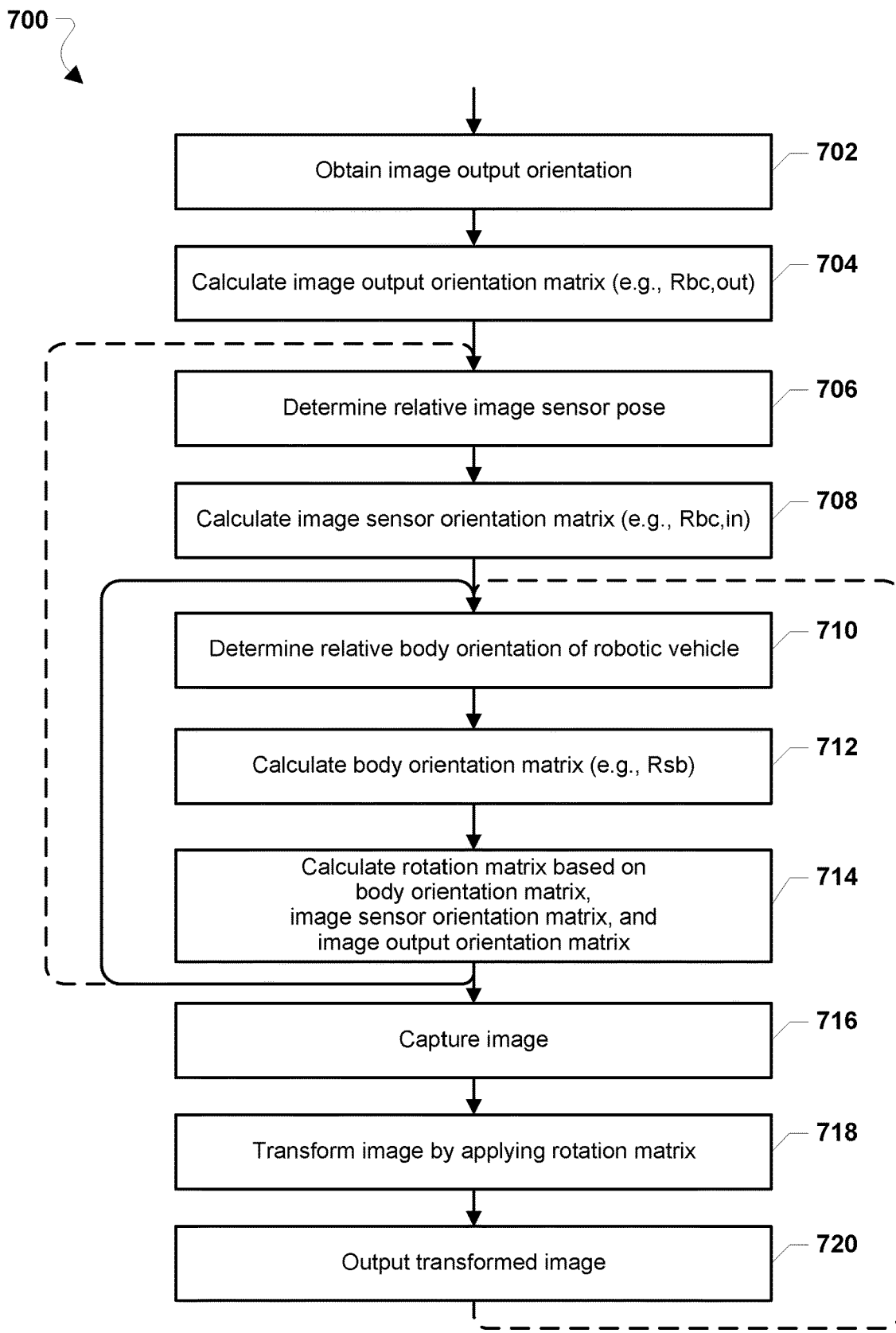
FIG. 7 is a process flow diagram illustrating a method of image processing in a robotic vehicle according to various embodiments.

FIG. 7 illustrates a method 700 of processing an image output in a robotic vehicle according to various embodiments. With reference to FIGS. 1-7, the method 700 may be implemented by a processor (e.g., the processor 220, 314, the SoC 312, and/or the like) of the robotic vehicle (e.g., 102, 200).

In block 702, the processor may obtain an image output orientation. In some embodiments, the image output orientation may include a landscape orientation or a portrait orientation. In some embodiments, the processor may obtain the image output orientation from a memory of the robotic vehicle. In some embodiments, the processor may obtain the image output orientation from the image sensor. In some embodiments, the processor maintains the image output orientation from one or more components of an image capture and processing system of the robotic vehicle (e.g., the image capture and processing system 400).

In block 704, the processor may calculate an image output orientation matrix. In some embodiments, the image output orientation matrix may be represented as Rbc,out.

In block 706, the processor may determine a relative image sensor pose of an image sensor of the robotic vehicle. In some embodiments, the image sensor pose may include a position of the image sensor in a coordinate system and an orientation of the image sensor. In some embodiments, the position and/or orientation of the image sensor may be relative to the body orientation of the robotic vehicle. For example, the position and/or orientation of the image sensor relative to the robotic vehicle body orientation may vary based on a variety of conditions. For example, the image sensor may be mounted on the robotic vehicle body and angle unique to a particular robotic vehicle. As another example, the relative position and orientation of the image sensor and the robotic vehicle body may have shifted or changed, due to motion or vibration of the robotic vehicle, robotic vehicle crashes, and other such conditions. In some embodiments, the image sensor may be mounted on a movable platform, such as a physical gimbal, a pivotable or rotatable joint, a mounting arm, or another similar movable platform.

In block 708, the processor may calculate an image sensor orientation matrix. In sonic embodiments, the image sensor orientation matrix may be represented as Rbc,in.

In block 710, the processor may determine a relative body orientation of the robotic vehicle. For example, the processor may receive or obtain information from one or more sensors of the robotic vehicle, and may determine the relative body orientation based on the sensor information.

In block 712, the processor may calculate a body orientation matrix. For example, the processor may calculate the body orientation matrix Rsb, as described above.

In block 714, the processor may calculate a rotation matrix based on the body orientation matrix, the image sensor orientation matrix, and the image output orientation matrix. In some embodiments, the processor may calculate a rotation matrix Rc, which may be represented by the following equation:

$$R_c = R_{b,c,in}^T R_{sb} R_{bc,out} \qquad \text{[Equation 5]}$$

In equation 5, T represents a transpose performed using the image sensor orientation matrix Rbc,in; Rsb represents the body orientation matrix; and Rbc,out represents the image output orientation matrix. In various embodiments, the rotation matrix Rc may be equal to the transpose of the image sensor orientation matrix multiplied by the body orientation matrix and further multiplied by the output image orientation matrix.

In some embodiments, the processor may again determine the relative body orientation of the robotic vehicle in block 710. For example, the processor may dynamically determine the relative body orientation of the robotic vehicle over time, to account for changes in the robotic vehicle body orientation that may be caused by motion, maneuvers, environmental conditions, and the like.

In some embodiments, the processor may again determine the relative image sensor pose in block 706. For example, the processor may dynamically determine the relative image sensor pose to account for changes in the relative pose of the image sensor the robotic vehicle body.

In block 716, the processor may capture an image, for example, using an image sensor of the robotic vehicle.

In block 718, the processor may transform the captured image by applying the rotation matrix. In some embodiments, the processor may apply the rotation matrix (e.g., the rotation matrix Rc) to the captured image to transform the image. In some embodiments, by transforming the image, the processor may produce a transformed image that compensates or corrects the captured image for the image sensor pose, the robotic vehicle body frame orientation, and the image output orientation of any combination of image sensors, robotic vehicle bodies, and image output orientations.

In block 720, the processor may output the transformed image. In various embodiments, the processor may store the output transformed image in a memory of the robotic vehicle. In various embodiments, the processor may transmit the transformed image from the robotic vehicle to another device. In various embodiments, the processor may display the transformed image, e.g., on a display or another output device of the robotic vehicle.

Figure 8:
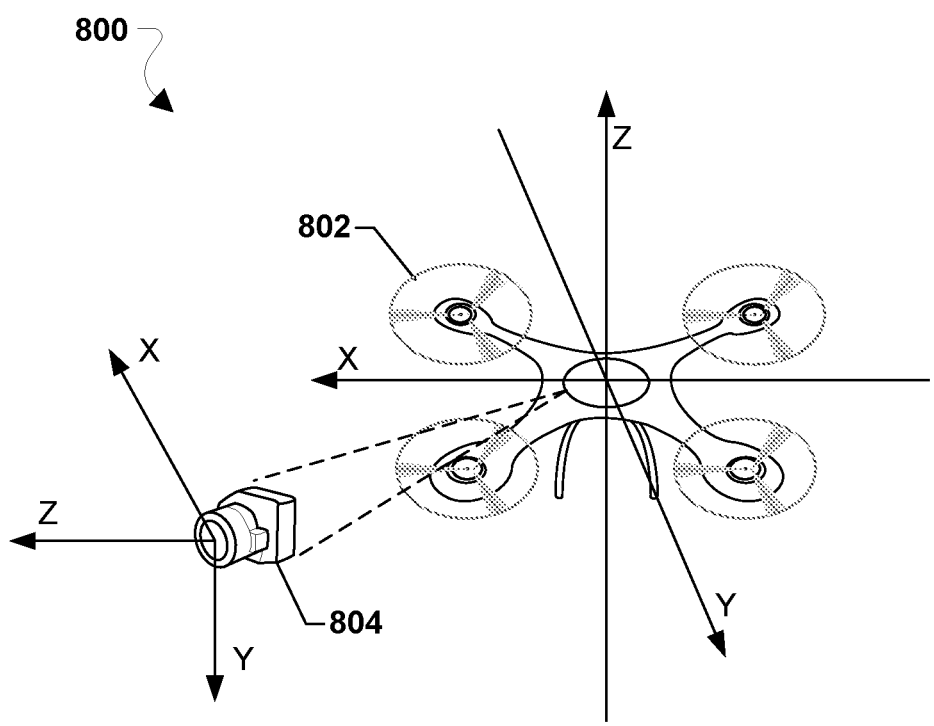
FIG. 8 illustrates a robotic vehicle body frame coordinate system and an image sensor coordinate system according to various embodiments.

FIG. 8 illustrates coordinate systems 800 that may be used in methods of processing an image output in a robotic vehicle 802. With reference to FIGS. 1-8, the coordinate systems 800 may be implemented by a processor (e.g., the processor 220, 314, the SoC 312 and/or the like) of the robotic vehicle 802. A robotic vehicle 802 may have a body frame coordinate system, and an image sensor 804 may have an image sensor coordinate system, in which the image sensor 804 is configured to capture images in landscape orientation, and an image processing system (e.g., the image capture and processing system 400) is configured to output an image in landscape orientation. An image sensor orientation matrix for the image sensor 804 (e.g., Rbc,in) may be equal to an image output orientation matrix (e.g., Rbc,out). This may be represented as Rbc,in=Rbc,out.

However, the body frame coordinate system of the robotic vehicle 802 (e.g., NNW) may be different from the image sensor coordinate system. For example, the z-axis of the image sensor coordinate system may be aligned with the x-axis of the body frame coordinate system.

In such embodiments, a processor of the robotic vehicle (e.g., the processor 220, 314, the SoC 312, and/or the like) may calculate a rotation matrix ($R_L$) to transform an image captured by the image sensor 804 from the image sensor coordinate system to the body frame coordinate system, which may be represented as follows:

$$R_{bc,in} = R_{bc,out} = R_L = \begin{bmatrix} 0 & 0 & 1 \\ -1 & 0 & 0 \\ 0 & -1 & 0 \end{bmatrix} \quad \text{[Equation 6]}$$

In equation 6, a rotation value along the z-axis of the image sensor coordinate system is 1 (i.e., same), and a rotation value along each of the x-axis and the z-axis is −1 (i.e., mirror).

Using the rotation matrix $R_L$, the processor may calculate a rotation matrix for a landscape orientation-to-landscape orientation conversion, which may be represented as follows:

$$R_c = R_L^T R_{sb} R_L \quad \text{[Equation 7]}$$

Figure 9:
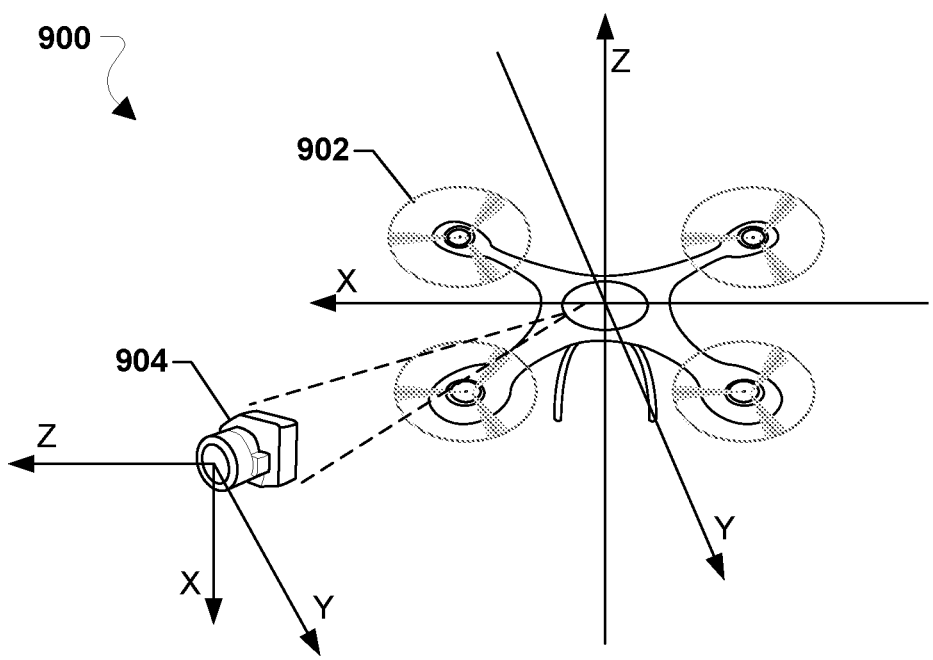
FIG. 9 illustrates a robotic vehicle body frame coordinate system and an image sensor coordinate system according to various embodiments.

FIG. 9 illustrates coordinate systems 900 that may be used in methods of processing an image output in a robotic vehicle 902. With reference to FIGS. 1-9, the coordinate systems 900 may be implemented by a processor (e.g., the processor 220, 3114, the SoC 312, and/or the like) of the robotic vehicle 902. A robotic vehicle 902 may have a body frame coordinate system, and an image sensor 904 may have an image sensor coordinate system, in which the image sensor 904 is configured to capture images in portrait orientation, and an image processing system (e.g., the image capture and processing system 400) is configured to output an image in portrait orientation. An image sensor orientation matrix for the image sensor 904 (e.g., Rbc,in) may be equal to an image output orientation matrix (e.g., Rbc,out), which may be represented as Rbc,in=Rbc,out.

However, the body frame coordinate system of the robotic vehicle 902 (e.g., NNW) may be different from the image sensor coordinate system. For example, the z-axis of the image sensor coordinate system may be aligned with the x-axis of the body frame coordinate system.

In such embodiments, a processor of the robotic vehicle (e.g., the processor 220, 314, the SoC 312, and/or the like) may calculate a rotation matrix ($R_P$) to transform an image captured by the image sensor 904 from the image sensor coordinate system to the body frame coordinate system, which may be represented as follows:

$$R_{bc,in} = R_{bc,out} = R_P = \begin{bmatrix} 0 & 0 & -1 \\ 0 & 1 & 0 \\ 1 & 0 & 0 \end{bmatrix} \quad \text{[Equation 8]}$$

In equation 6, a rotation value along the z-axis of the image sensor coordinate system is −1 (i.e., mirror), and a rotation value along each of the x-axis and the z-axis is 1 (i.e., same).

Using the rotation matrix $R_P$, the processor may calculate a rotation matrix for a portrait orientation-to-portrait orientation conversion, which may be represented as follows:

$$R_c = R_P^T R_{sb} R_P \quad \text{[Equation 9]}$$

Figure 10:
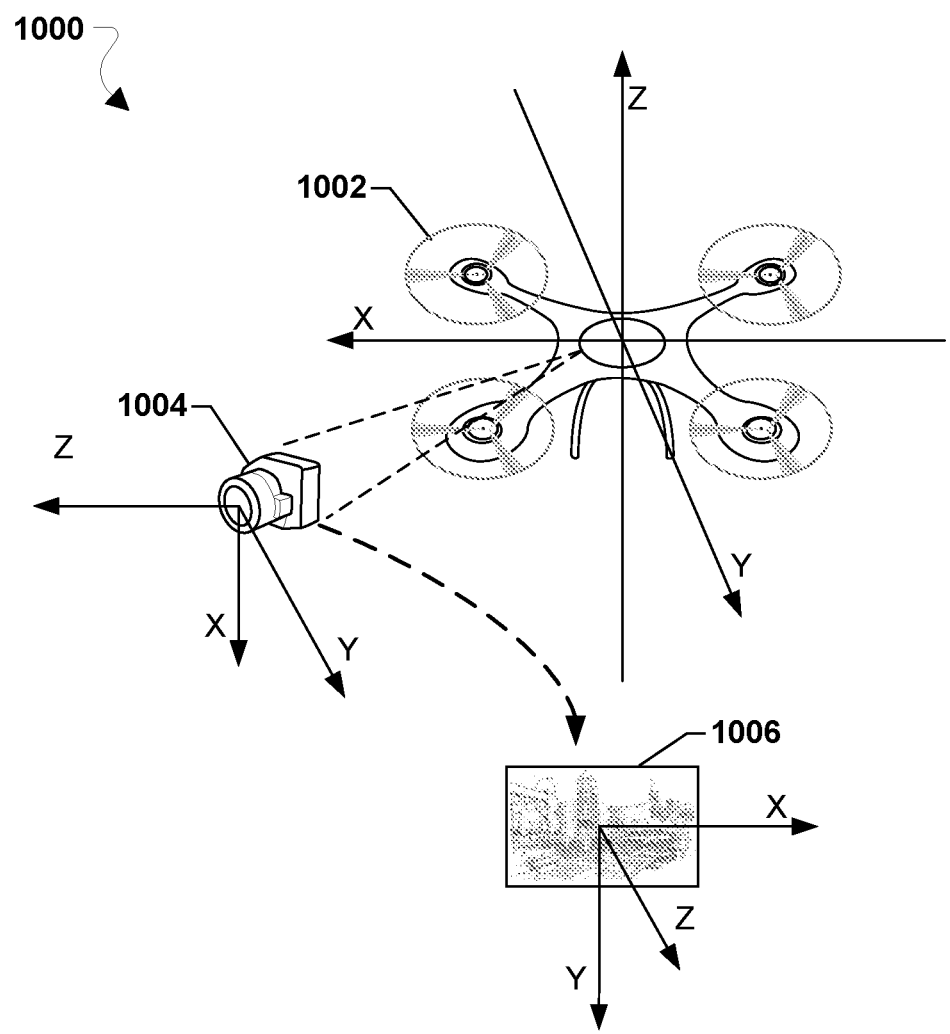
FIG. 10 illustrates a robotic vehicle body frame coordinate system, an image sensor coordinate system, and an output image orientation system according to various embodiments.

FIG. 10 illustrates coordinate systems 1000 that may be used in methods of processing an image output in a robotic vehicle 1002. With reference to FIGS. 1-10, the coordinate systems 1000 may be implemented by a processor (e.g., the processor 220, 314, the SoC 312, and/or the like) of the robotic vehicle 1002. A robotic vehicle 1002 may have a body frame coordinate system (e.g., NWU), and an image sensor 1004 may have an image sensor coordinate system, in which the image sensor 1004 is configured to capture images in portrait orientation, and an image processing system (e.g., the image capture and processing system 400) is configured to output an image 1006 in landscape orientation. Thus, an image sensor orientation matrix for the image sensor 1004 (e.g., Rbc,in) is different from an image output orientation matrix (e.g., Rbc,out).

In some embodiments, a processor of the robotic vehicle (e.g., the processor 220, 314, the SoC 312, and/or the like) may calculate a rotation matrix for portrait ($R_P$) that may be equal to the image sensor orientation matrix Rbc,in, which may be represented as follows:

$$R_{bc,in} = R_P = \begin{bmatrix} 0 & 0 & -1 \\ 0 & 1 & 0 \\ 1 & 0 & 0 \end{bmatrix} \quad \text{[Equation 10]}$$

Further, the processor of the robotic vehicle may calculate a rotation matrix for landscape ($R_L$) that may be equal to the image output orientation matrix Rbc,out, which may be represented as follows:

$$R_{bc,out} = R_L = \begin{bmatrix} 0 & 0 & 1 \\ -1 & 0 & 0 \\ 0 & -1 & 0 \end{bmatrix} \quad \text{[Equation 11]}$$

Using the rotation matrices $R_P$ and $R_L$, the processor may calculate a rotation matrix equal to a transpose (T) of the portrait rotation matrix multiplied by the body coordinate frame and further multiplied by the landscape rotation matrix, which may be represented as follows:

$$R_c = R_P^T R_{sb} R_L \quad \text{[Equation 12]}$$

Figure 11:
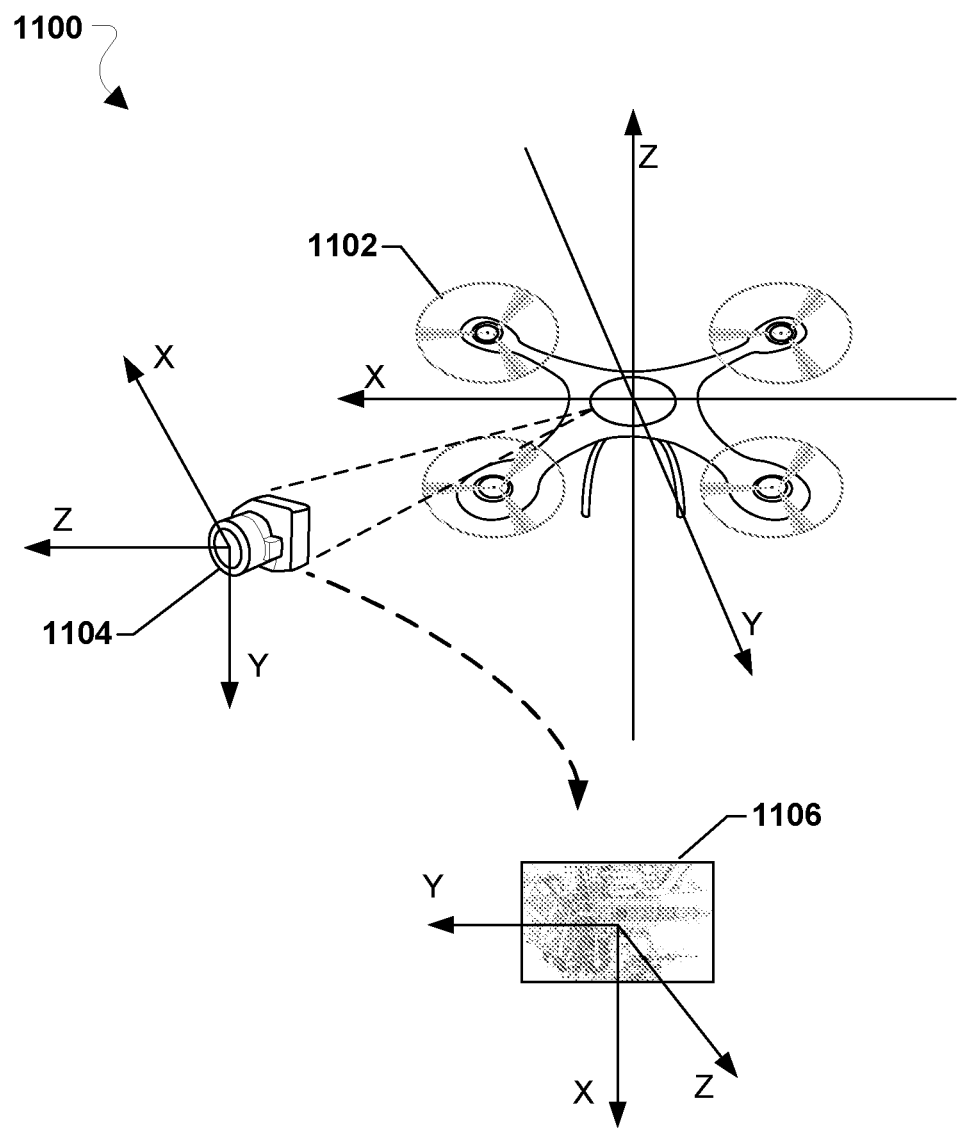
FIG. 11 illustrates a robotic vehicle body frame coordinate system, an image sensor coordinate system, and an output image orientation system according to various embodiments.

FIG. 11 illustrates coordinate systems 1100 that may be used in methods of processing an image output in a robotic vehicle 1102. With reference to FIGS. 1-11, the coordinate systems 1100 may be implemented by a processor (e.g., the processor 220, 314, the SoC 312, and/or the like) of the robotic vehicle 1002. A robotic vehicle 1102 may have a body frame coordinate system (e.g., NWU), and an image sensor 1104 may have an image sensor coordinate system, in which the image sensor 1104 is configured to capture images in landscape orientation, and an image processing system (e.g., the image capture and processing system 400) is configured to output an image 1106 in portrait orientation. Thus, an image sensor orientation matrix for the image sensor 1104 (e.g., Rbc,in) is different from an image output orientation matrix (e.g., Rbc,out).

In some embodiments, a processor of the robotic vehicle (e.g., the processor 220, 314, the SoC 312, and/or the like) may calculate a rotation matrix for landscape ($R_L$) that may be equal to the image sensor orientation matrix Rbc,in, which may be represented as follows:

$$R_{bc,out} = R_L = \begin{bmatrix} 0 & 0 & 1 \\ -1 & 0 & 0 \\ 0 & -1 & 0 \end{bmatrix} \quad \text{[Equation 13]}$$

Further, the processor of the robotic vehicle may calculate a rotation matrix for portrait ($R_P$) that may be equal to the image output orientation matrix Rbc,out, which may be represented as follows:

$$R_{bc,in} = R_P = \begin{bmatrix} 0 & 0 & -1 \\ 0 & 1 & 0 \\ 1 & 0 & 0 \end{bmatrix} \quad \text{[Equation 14]}$$

Using the rotation matrices $R_L$ and $R_P$, the processor may calculate a rotation matrix equal to a transpose (T) of the portrait rotation matrix multiplied by the body coordinate frame and further multiplied by the landscape rotation matrix, which may be represented as follows:

$$R_c = R_L^T R_{sb} R_P \quad \text{[Equation 15]}$$

Various embodiments enable the processor of the robotic vehicle to improve image capture and processing by the robotic vehicle. Various embodiments provide methods implemented by a processor of a robotic vehicle for processing an image captured by an image sensor of the robotic vehicle that may be employed in any combination of image sensors, robotic vehicle body frames, and image output orientations. Various embodiments improve efficiency and accuracy of image processing of images captured by a robotic vehicle, and further improve the efficiency and accuracy of image processing of such images for a wide range of robotic vehicle body frames that may use differing body frame coordinate systems, as well as different image sensor mountings to the robotic vehicle.

Various embodiments illustrated and described are provided merely as examples to illustrate various features of the claims. However, features shown and described with respect to any given embodiment are not necessarily limited to the associated embodiment and may be used or combined with other embodiments that are shown d described. Further, the claims are not intended to be limited by any one example embodiment. For example, one or more of the operations of the method 700, and any of the coordinate systems 800, 900, 1000, and 1100 may be substituted for or combined with one or more operations of the method 700 and the coordinate systems 800, 900, 1000, and 1100, and vice versa.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method of processing an image captured by an image sensor of a robotic vehicle, comprising:
    calculating an image output orientation matrix for an image that is output by the image sensor;
    determining an image sensor pose relative to a body orientation of the robotic vehicle;
    calculating an image sensor orientation matrix for the image sensor based on the image sensor pose relative to the body orientation of the robotic vehicle;
    calculating a body orientation matrix of the robotic vehicle; and
    transforming an image captured by the image sensor from an image sensor coordinate system of the image sensor to a body frame coordinate system of the robotic vehicle based on the image output orientation matrix, the image sensor orientation matrix, and the body orientation matrix.

2. The method of claim 1, wherein transforming the image captured by the image sensor based on the image output orientation matrix, the image sensor orientation matrix, and the body orientation matrix comprises:
    calculating a rotation matrix based on the image output orientation matrix, the image sensor orientation matrix, and the body orientation matrix; and
    transforming the image captured by the image sensor based on the rotation matrix.

3. The method of claim 1, wherein the image output orientation matrix is based on an orientation of the image output by the image sensor.

4. The method of claim 1, wherein the body orientation matrix is based on the body frame coordinate system, and the image sensor orientation matrix is based on the image sensor coordinate system that is different from the body frame coordinate system.

5. The method of claim 1, wherein the body orientation matrix is based on the body frame coordinate system, the image sensor orientation matrix is based on the image sensor coordinate system that is different from the body frame coordinate system, and the image output orientation matrix is based on a coordinate system that is different from one or both of the body frame coordinate system and the image sensor coordinate system.

6. The method of claim 1, further comprising determining a relative body orientation of the robotic vehicle, wherein the body orientation matrix is based on the relative body orientation of the robotic vehicle.

7. The method of claim 1, further comprising outputting the transformed image.

8. A robotic vehicle, comprising:
    an image sensor; and
    a processor coupled to the image sensor and configured with processor-executable instructions to:
        calculate an image output orientation matrix for an image that is output by the image sensor;
        determine an image sensor pose relative to a body orientation of the robotic vehicle;
        calculate an image sensor orientation matrix for the image sensor based on the image sensor pose relative to the body orientation of the robotic vehicle;
        calculate a body orientation matrix of the robotic vehicle; and
        transform an image captured by the image sensor from an image sensor coordinate system of the image sensor to a body frame coordinate system of the robotic vehicle based on the image output orientation matrix, the image sensor orientation matrix, and the body orientation matrix.

9. The robotic vehicle of claim 8, wherein the processor is further configured to:
    calculate a rotation matrix based on the image output orientation matrix, the image sensor orientation matrix, and the body orientation matrix; and
    transform the image captured by the image sensor based on the rotation matrix.

10. The robotic vehicle of claim 8, wherein the processor is further configured such that the image output orientation matrix is based on an orientation of the image output by the image sensor.

11. The robotic vehicle of claim 8, wherein the processor is further configured such that the body orientation matrix is based on the body frame coordinate system, and the image sensor orientation matrix is based on the image sensor coordinate system that is different from the body frame coordinate system.

12. The robotic vehicle of claim 8, wherein the processor is further configured such that the body orientation matrix is based on the body frame coordinate system, the image sensor orientation matrix is based on the image sensor coordinate system that is different from the body frame coordinate system, and the image output orientation matrix is based on a coordinate system that is different from one or both of the body frame coordinate system and the image sensor coordinate system.

13. The robotic vehicle of claim 8, wherein the processor is further configured to:
    determine a relative body orientation of the robotic vehicle, wherein the body orientation matrix is based on the relative body orientation of the robotic vehicle.

14. The robotic vehicle of claim 8, wherein the processor is further configured to:
output the transformed image.

15. A processing device for use in a robotic vehicle configured to:
calculate an image output orientation matrix for an image that is output by an image sensor;
determine an image sensor pose relative to a body orientation of the robotic vehicle;
calculate an image sensor orientation matrix for the image sensor based on the image sensor pose relative to the body orientation of the robotic vehicle;
calculate a body orientation matrix of the robotic vehicle; and
transform an image captured by the image sensor from an image sensor coordinate system of the image sensor to a body frame coordinate system of the robotic vehicle based on the image output orientation matrix, the image sensor orientation matrix, and the body orientation matrix.

16. The processing device of claim 15, further configured to:
calculate a rotation matrix based on the image output orientation matrix, the image sensor orientation matrix, and the body orientation matrix; and
transform the image captured by the image sensor based on the rotation matrix.

17. The processing device of claim 15, further configured such that the image output orientation matrix is based on an orientation of the image output by the image sensor.

18. The processing device of claim 15, further configured such that the body orientation matrix is based on the body frame coordinate system, and the image sensor orientation matrix is based on the image sensor coordinate system that is different from the body frame coordinate system.

19. The processing device of claim 15, further configured such that the body orientation matrix is based on the body frame coordinate system, the image sensor orientation matrix is based on the image sensor coordinate system that is different from the body frame coordinate system, and the image output orientation matrix is based on a coordinate system that is different from one or both of the body frame coordinate system and the image sensor coordinate system.

20. The processing device of claim 15, further configured to:
determine a relative body orientation of the robotic vehicle, wherein the body orientation matrix is based on the relative body orientation of the robotic vehicle.

21. The processing device of claim 15, further configured to output the transformed image.

22. A robotic vehicle, comprising:
an image sensor;
means for calculating an image output orientation matrix for an image that is output by the image sensor;
means for determining an image sensor pose relative to a body orientation of the robotic vehicle;
means for calculating an image sensor orientation matrix for the image sensor based on the image sensor pose relative to the body orientation of the robotic vehicle;
means for calculating a body orientation matrix of the robotic vehicle; and
means for transforming an image captured by the image sensor from an image sensor coordinate system of the image sensor to a body frame coordinate system of the robotic vehicle based on the image output orientation matrix, the image sensor orientation matrix, and the body orientation matrix.

23. The robotic vehicle of claim 22, wherein means for transforming the image captured by the image sensor based on the image output orientation matrix, the image sensor orientation matrix, and the body orientation matrix comprises:
means for calculating a rotation matrix based on the image output orientation matrix, the image sensor orientation matrix, and the body orientation matrix; and
means for transforming the image captured by the image sensor based on the rotation matrix.

24. The robotic vehicle of claim 22, wherein the image output orientation matrix is based on an orientation of the image output by the image sensor.

25. The robotic vehicle of claim 22, wherein the body orientation matrix is based on the body frame coordinate system, and the image sensor orientation matrix is based on the image sensor coordinate system that is different from the body frame coordinate system.

26. The robotic vehicle of claim 22, wherein the body orientation matrix is based on the body frame coordinate system, the image sensor orientation matrix is based on the image sensor coordinate system that is different from the body frame coordinate system, and the image output orientation matrix is based on a coordinate system that is different from one or both of the body frame coordinate system and the image sensor coordinate system.

\* \* \* \* \*